(12) United States Patent  (10) Patent No.: US 8,934,372 B2
Diab et al.  (45) Date of Patent: Jan. 13, 2015

(54) SYSTEM AND METHOD FOR NEXT GENERATION BASE-T COMMUNICATION

(71) Applicant: Broadcom Corporation, Irvine, CA (US)

(72) Inventors: Wael William Diab, San Francisco, CA (US); William Calvin Woodruff, Pleasonton, CA (US)

(73) Assignee: Broadcom Corporation, Irvine, CA (US)

( * ) Notice: Subject to any disclaimer, the term of this patent is extended or adjusted under 35 U.S.C. 154(b) by 128 days.

(21) Appl. No.: 13/784,936

(22) Filed: Mar. 5, 2013

(65) Prior Publication Data

US 2013/0265895 A1  Oct. 10, 2013

Related U.S. Application Data

(60) Provisional application No. 61/620,198, filed on Apr. 4, 2012.

(51) Int. Cl.
*H04L 12/26* (2006.01)
*H04L 12/28* (2006.01)
*H04L 12/24* (2006.01)

(52) U.S. Cl.
CPC ........ *H04L 41/0896* (2013.01); *H04L 41/0816* (2013.01); *H04L 43/50* (2013.01)
USPC .......................................... 370/252; 370/254

(58) Field of Classification Search
USPC .......................... 370/252, 359, 419, 463, 468
See application file for complete search history.

(56) References Cited

U.S. PATENT DOCUMENTS

| 6,246,694 | B1 * | 6/2001 | Chen | 370/468 |
|---|---|---|---|---|
| 8,279,969 | B2 * | 10/2012 | Betts | 375/295 |
| 8,370,701 | B2 * | 2/2013 | Diab et al. | 714/753 |
| 8,595,583 | B2 | 11/2013 | Diab et al. | |
| 8,797,909 | B1 * | 8/2014 | Lo | 370/252 |
| 2002/0106010 | A1 * | 8/2002 | Jones | 375/219 |
| 2002/0114398 | A1 * | 8/2002 | Lin et al. | 375/253 |
| 2005/0063479 | A1 * | 3/2005 | Propp et al. | 375/260 |
| 2005/0288029 | A1 * | 12/2005 | Jacobsen | 455/447 |
| 2008/0225881 | A1 * | 9/2008 | Powell | 370/463 |
| 2009/0154491 | A1 * | 6/2009 | Diab | 370/465 |
| 2009/0274170 | A1 * | 11/2009 | Yu et al. | 370/466 |
| 2009/0316722 | A1 * | 12/2009 | Traeber | 370/468 |
| 2012/0314716 | A1 * | 12/2012 | Barkan et al. | 370/465 |

* cited by examiner

*Primary Examiner* — Warner Wong
(74) *Attorney, Agent, or Firm* — Duane S. Kobayashi

(57) ABSTRACT

A system and method for next generation BASE-T communication. Next generation BASE-T devices designed for communication over twisted pair Ethernet cabling are configurable based on the characteristics of the communication channel. In discovering the characteristics of the communication channel, the physical layer device (PHY) can select one of a plurality of operating modes that can support a given data transmission rate (e.g., 10 Gbit/s, 40 Gbit/s, 100 Gbit/s, 400 Gbit/s, etc.).

20 Claims, 3 Drawing Sheets

SYSTEM AND METHOD FOR NEXT GENERATION BASE-T COMMUNICATION

This application claims priority to provisional application No. 61/620,198, filed Apr. 4, 2012, which is incorporated herein by reference in its entirety.

BACKGROUND

1. Field of the Invention

The present invention relates generally to networking and, more particularly, to a system and method for next generation BASE-T communication.

2. Introduction

Management of an IT infrastructure is a key factor in the operation of any enterprise. For example, data centers have elevated in importance as their resilient operation is crucial to the delivery of services by the enterprise. Various initiatives such as energy efficiency, security and virtualization have become the focus of many efforts to improve the ability of the IT infrastructure to meet their performance objectives.

The IT infrastructure will continue to evolve as next-generation technologies are adopted for use in the enterprise environment. For example, higher bandwidth data links will continue to be introduced into the IT infrastructure to cope with the increased data needs of applications being supported by the enterprise.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
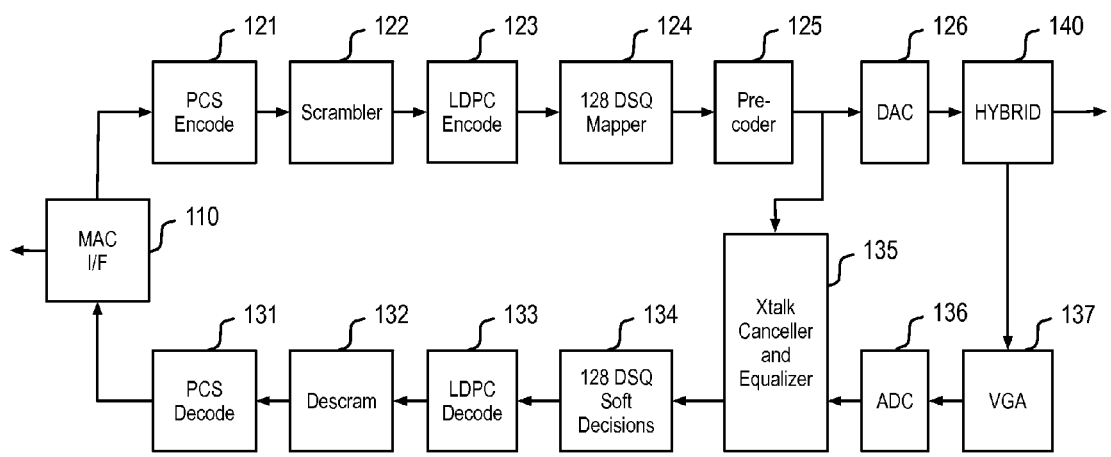
FIG. 1 illustrates an example architecture of a 10 Gbit/s physical layer device.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Next generation BASE-T devices designed for communication over twisted pair Ethernet cabling are configurable based on the characteristics of the communication channel. The characteristics of the communication channel can vary, for example, based on the type, length, temperature, application, etc. of the Ethernet cabling used. In determining the characteristics of the communication channel, the physical layer device (PHY) can select based on the determined communication cable characteristics, one of a plurality of operating modes that can support a given data transmission rate (e.g., 10 Gbit/s, 40 Gbit/s, 100 Gbit/s, 400 Gbit/s, etc.) over the twisted pair Ethernet cabling. For example, where a first of a plurality of operating modes for 10 Gbit/s operation is defined to support a short-reach cable link and a second of the plurality of operating modes for 10 Gbit/s operation can be defined to support a long-reach cable link, the determination of a length of the twisted pair Ethernet cable can be used to determine which of the first or second operating modes should be selected for configuration of the PHY. In general, the plurality of operating modes for a given data transmission rate can be characterized by different baud rates, simplex/duplex modes, circuitry activation/deactivation (e.g., cancellation circuitry, encoding circuitry, etc.), signal processing variations, or the like that are designed to operate with the particular communication channel characteristics of the twisted pair Ethernet cable (e.g., length, type, temperature, etc.).

In one embodiment, the PHY includes a cable diagnostic module that is configured to determine communication channel characteristics of a twisted pair Ethernet cable to which the PHY is coupled, and a controller that is designed to select, based on the determined communication channel characteristics, a first of a plurality of operating modes for use by the PHY in communicating over the twisted pair Ethernet cable. In one example, each of the plurality of operating modes can transmit substantially at the same data transmission rate while using different signal constellations.

In the description below, reference is made to 10GBASE-T to illustrate the features of the present invention. Such an example is not intended to be limiting on the scope of the present invention. As would be apparent, the principles of the present invention can be applied to any standardized or non-standardized data link where different installations of the PHY have variations in the communication channel that are significant enough to warrant a definition of different operating modes for a given data transmission rate.

To illustrate one such application where sufficient variation exists, consider a data center application to which a PHY could be applied. Today, Top-Of-Rack (TOR) and End-Of-Row (EOR) designs are common in data center topologies.

In the TOR design, servers connect to one or two Ethernet switches that are installed inside a rack enclosure. The TOR switch is typically a low profile unit (e.g., 1RU-2RU) that enables all copper cabling for the servers within the rack enclosure to stay within the rack. The cabling can therefore be short RJ45 patch cables (e.g., less than 10 meters) that connect the servers to the rack switch. The TOR Ethernet switch would then link the rack to aggregation switches in the data center network.

In the EOR design, racks that include a plurality of servers are lined up side by side in a row. At the end of each row is a rack that includes switches that provide network connectivity to the servers within that row. Each server rack would have a bundle of twisted pair copper cabling that would be routed to the EOR switch rack. While the EOR server rack may not necessarily be located at the actual end of each row, the twisted pair copper cabling would represent at least a medium length span (e.g., 20-60 meters).

As these examples illustrate, a PHY in a server or switch can be used with various types of network installations. In general, a 10GBASE-T PHY has been designed to support structured cabling that includes link lengths up to 100 meters using Category 6A or better Ethernet cabling.

As defined by the IEEE 802.3an standard, 10GBASE-T uses a Tomlinson-Harashima precoded (THP) version of pulse-amplitude modulation with 16 discrete levels (PAM-16), encoded in a two-dimensional checkerboard pattern known as DSQ128, along with Low Density Parity Check (LPDC) block coding for full-duplex communication over four wire pairs.

An example architecture of a 10 Gbit/s physical layer device (PHY) is illustrated in FIG. 1. As illustrated, the PHY transceiver includes media access control (MAC) I/F 110, which can be designed to support XGMII or XAUI interfaces, as an example. On the transmission side, the PHY transceiver can include PCS encode 121, Scrambler 122, LDPC 123, 128 DSQ Mapper 124, Pre-Coder 125, Digital-Analog Converter (DAC) 126, and Hybrid 140. Correspondingly, on the receiver side, signals received at Hybrid 140, are processed by Variable Gain Amplifier (VGA) 137, Analog-Digital Converter (ADC) 136, Crosstalk (Xtalk) Canceller and Equalizer 135, 128 DSQ Soft Decisions 134, LDPC Decode 133, Descrambler 132, and PCS decode 131, which delivers signals to MAC I/F 110.

When applied to a data center context, a 10GBASE-T PHY can be used with Ethernet cabling that is significantly shorter than the 100-meter worst case assumption of the IEEE 802.3an standard. For example, as noted above, a 10GBASE-T PHY can be used in a TOR application to communicate over a short patch cable. In this example application, the 10GBASE-T PHY would operate in the same PAM-16 operating mode that was defined for the 100-meter worst case Ethernet link.

In the present invention, it is recognized that a PHY that is designed to support communication channels that vary significantly in their characteristics need not rely on a single operating mode. It is therefore a feature of the present invention that a single PHY can be designed with a plurality of operating modes, which can be collectively intended to target or otherwise address variations in the communication channel.

A first example of a variation in the communication channel is the type of Ethernet cable. As would be appreciated, Ethernet cable types such as Category 3, 5, 5e, 6, 6A, 7, 7A, etc. have been defined to support different levels of transmission performance. As noted above, advanced Category 6A, 7, 7A, or better cabling types can support 10GBASE-T. Category 6A cabling can support frequencies in the range of 0-500 Mhz and represents the minimum supported cabling for 10GBASE-T. In contrast, Category 7 cabling can support frequencies in the range of 0-600 Mhz, while Category 7A cabling can support frequencies in the range of 0-1000 Mhz. Future cabling systems can also be defined that use enhanced components, components that are tested out/characterized to higher frequencies (e.g. 1.6 Ghz or 2 Ghz), new magnetics in the channel, etc.

A second example of a variation in the communication channel is the length of the Ethernet cable. Notably, the signal attenuation on the communication channel is proportional to the length of the cable. As such, the length of the cable directly impacts the signal-to-noise ratio (SNR) of the received signal. A further example of a variation in the communication channel is that produced by changes in the temperature of the cable.

The combination of type and length of cabling represents an example tradeoff that can impact the performance of the PHY. As noted, 10GBASE-T was designed with a PAM-16 signal constellation that required at least Category 6A cabling to operate at 100 meters. Where a shorter link length is present, lesser quality cabling can be used. For instance, Category 6 cabling can be used to support the same PAM-16 signal constellation where the link is less than 55 meters.

In the present invention, additional operating modes are defined for a given transmission rate that can exploit variations in the communication channel. For example, an additional operating mode can be defined for use by a 10GBASE-T PHY when it is coupled to a patch cable. As the communication channel characteristics for the patch cable are inherently better than a worst-case 100 meter cable of a given type, the additional operating mode can be designed to exploit the improved margins in the communication channel characteristics.

In one example, the additional operating mode can be designed with a reduced constellation (e.g., PAM 4). To achieve the same 10 gigabit/s data transmission rate, the reduced constellation can be run at a higher frequency that is afforded by the improved communication channel characteristics. In other words, the additional operating mode can be designed with a different baud rate as compared to a conventional 10GBASE-T operating mode for use with up to 100 meters of cabling.

In general, the signal processing or coding requirements can be relaxed in an additional operating mode where improved communication channel characteristics are known. For example, LDPC requirements can be lessened or removed altogether in the additional operating mode where the improved communication channel characteristics are known. In yet another example, the additional operating mode can be defined that uses simplex mode as compared to duplex mode and/or could use less than the four wire pairs (e.g., "clean" set of wire pairs) needed in the conventional 10GBASE-T operating mode. In another embodiment, the echo canceller could also be turned off.

In general, the principles of the present invention are designed to take advantage of the communication channel characteristics through a definition of one or more additional operating modes that are defined for a given transmission rate. In various examples, these one or more additional operating modes can be defined in a way to exploit the improved characteristics of a communication channel.

Figure 2:
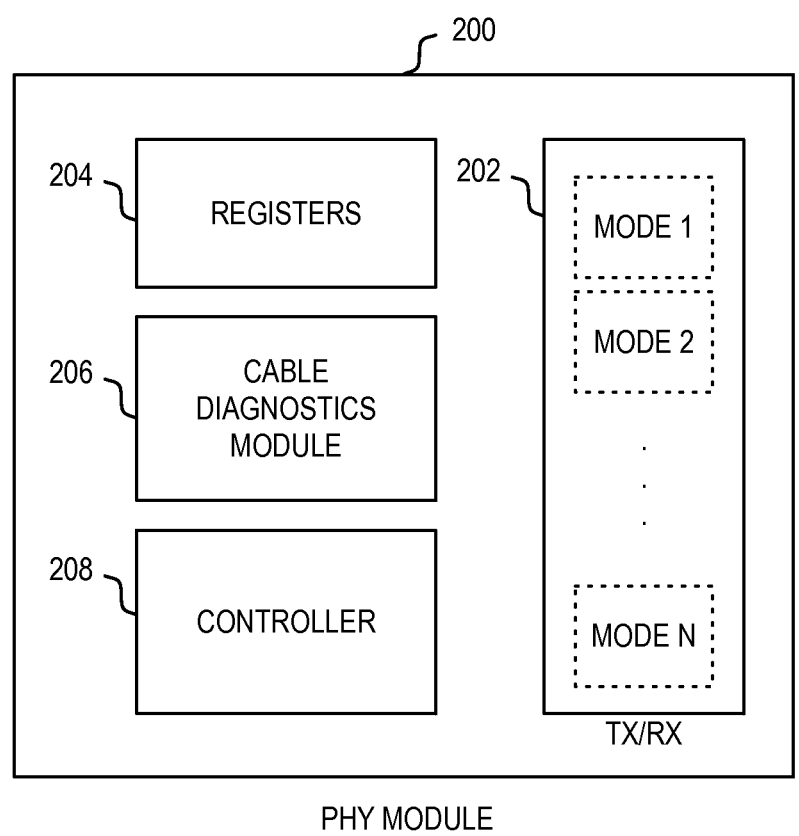
FIG. 2 illustrates an embodiment of a configurable physical layer device.

FIG. 2 illustrates an example embodiment of a configurable PHY according to the present invention. As illustrated, PHY 200 includes transmit/receive (TX/RX) module 202, registers 204, cable diagnostic module 206, and controller 208.

In general, TX/RX module 202 can be configured to operate in one of a plurality of supported operating modes 1-N. In the illustration of FIG. 2, the plurality of operating modes are illustrated based on their logical operational functionality. In actual implementation, various operating modes can include common hardware TX/RX components that are shared. As would be appreciated, the particular hardware mechanism by which a plurality of operating modes are supported by a PHY would be implementation dependent.

In one embodiment, a plurality of operating modes can be defined for a given transmission rate. The selection of a particular operating mode can be based on measurements by cable diagnostic module 206. In one embodiment, cable diagnostics module 206 can perform the cable diagnostics independently or in cooperation with an active data communication process that is occurring with a device on the other end of the Ethernet cable. As would be appreciated, the specific mechanism and corresponding method by which cable diagnostics module 206 operates in the context of a cooperative cable diagnostic process would be implementation dependent.

In general, cable diagnostics performed by cable diagnostics module 206 are performed under the control of controller 208. Cable diagnostics module 206 can be designed to generate and transmit a signal (e.g., pulses) into the Ethernet cable, and to measure a return or reflected signal received by TX/RX module 202. Signals received by TX/RX module 202 are then processed by cable diagnostics module 206 to determine various cabling parameters reflective of communication channel characteristics.

One example of a communication channel characteristic is the determination of an Ethernet cable length through time-domain reflectometry (TDR), which relies on the transmission of a pulse into the communication cable and the measurement of returned reflections of the transmitted pulse. In yet another example, PHY module 200 measurements can be used to determine a type of cabling (e.g., Category 6A, 7, 7A, etc.) that is coupled to the patch panel port. As described in greater detail in U.S. Pat. No. 7,664,972, entitled "System and Method for Controlling Power Delivered to a Powered Device Based on Cable Characteristics," which is incorporated herein by reference in its entirety, PHY measurements such as crosstalk and insertion loss can be used to determine a type of structured Ethernet cabling. The measurements taken by PHY module 200 can be stored in memory registers 204, which can be retrieved for use in the configuration of TX/RX module 202.

Figure 3:
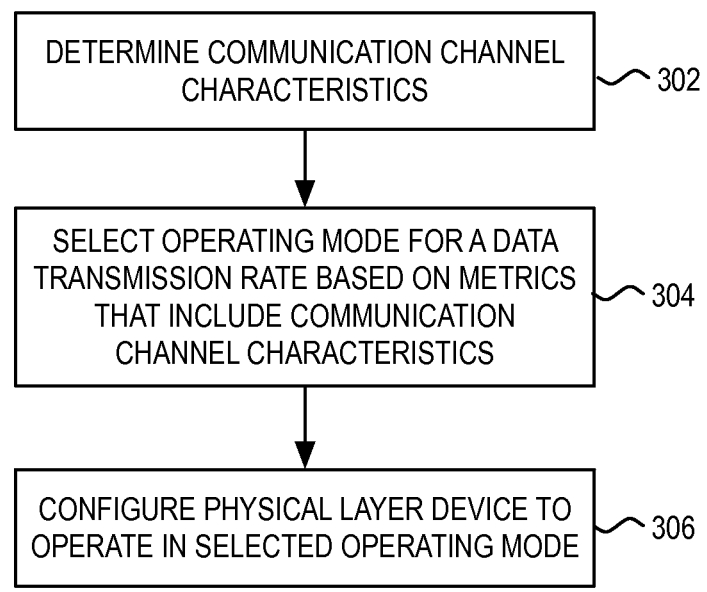
FIG. 3 illustrates a flowchart of an example process of the present invention.

FIG. 3 illustrates a flowchart of an example process of the present invention. As illustrated, the process begins at step 302 where communication channel characteristics are determined for an Ethernet cable coupled to a PHY. In one embodiment, the communication channel characteristics are determined using a cable diagnostics module within the PHY. As noted above, this cable diagnostics module can operate independently or in cooperation with an active data communication process that is occurring with a device on the other end of the Ethernet cable. Such an example is not intended to limit the scope of the present invention.

In another embodiment, the communication channel characteristics can be determined using a configuration process. For example, the communication channel characteristics can be delivered or otherwise made available to the PHY based on a network administration or configuration process. In one example, a network management protocol such as the Simple Network Management Protocol (SNMP) can be used. As would be appreciated, any network management protocol could be used. In other embodiments, Link Layer Discovery Protocol (LLDP) messaging or physical layer communication can also be used.

In yet another embodiment, the communication channel characteristics can be delivered or otherwise made available to the PHY by a host system. For example, a PHY that is incorporated in a switch or a server can gain access to the communication channel characteristics via the host of the switch or server.

In yet another embodiment, the communication channel characteristics can be delivered or otherwise made available to the PHY by a link partner during an autonegotiation process. As would be appreciated, the particular mechanism of determining the communication channel characteristics would be implementation dependent.

After the communication channel characteristics are determined, one of a plurality of operating modes that enable communication at a given data transmission rate is selected at step 304 based on metrics that include the determined communication channel characteristics. For example, the selection process can select one of a plurality of operating modes that enable communication at a 10 Gbit/s rate, select one of a plurality of operating modes that enable communication at a 40 Gbit/s rate, select one of a plurality of operating modes that enable communication at a 100 Gbit/s rate, select one of a plurality of operating modes that enable communication at a 400 Gbit/s rate etc.

In general, the plurality of modes that are defined for a given data transmission rate are intended to exploit variances in the communication channel characteristics that occur in different installation scenarios. In a simple example, the selection process can be based on a single communication channel characteristic such as the length of the Ethernet cable. In another example, the selection process can be based on a single communication channel characteristic such as the type of Ethernet cable.

In a more complex example, the selection process can be based on two or more communication channel characteristics. For example, the selection process can be based on two communication channel characteristics such as the length of the Ethernet cable and the type of Ethernet cable. In another example, the selection process can be based on communication channel characteristics such as the length of the Ethernet cable, the type of Ethernet cable, and the temperature of the Ethernet cable as well as the application. In one example, the knowledge of whether it is an edge application or an aggregation application can be used as a tie breaker where the communication channel characteristics are ambiguous. In general, the particular number and combination of considerations would be implementation dependent as the number and combination of considerations used in the selection process can depend on the particular set of operating modes defined for the PHY.

In one embodiment, the selection process is performed in association with the link partner. For example, the selection process can be performed in the context of an autonegotiation process. In this example, the autonegotiation process can be designed to allow selection of the defined set of operating modes for the given data transmission rate (e.g., using autonegotiation next page messages), wherein the determined communication channel characteristics are used to constrain the set of operating modes that can be automatically selected by the autonegotiation process.

After the operating mode has been selected at step 304, the physical layer device can then be configured to operate in the selected operating mode at step 306. The particular configuration process would be dependent on the set of defined operating modes. As noted above, the configuration process could configure one or more of the signal constellation, the speed, the signal processing, the encoding process, the simplex/duplex mode, the number of wire pairs used, the cancellation circuitry used, etc.

After configuration at step 306, the PHY could then communicate with the selected configuration. It is significant that such communication has been designed to operate with the particular communication channel characteristics of the Ethernet cable.

As would be appreciated, the principles of the present invention can be used with various port types (e.g., backplane, twisted pair, optical, etc.) as well as standard or non-standard (e.g., 2.5 G, 5 G, 10 G, 20 G, 25 G, 28 G, 40 G, 100 G, 400 G, etc.) link rates, as well as future link rates (e.g., 1000 G and beyond). The principles of the present invention can also be applied to an asymmetric configuration of the link.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   determining, by a physical layer device, communication channel characteristics of a twisted pair cable to which said physical layer device is coupled, wherein said communication channel characteristics include a length of said twisted pair cable;
   selecting, based on said determined communication channel characteristics, between a plurality of operating modes for use by said physical layer device in communicating over said twisted pair cable at a data transmission rate of X bits/s, wherein each of said plurality of operating modes configures said physical layer device for transmission substantially at the same data transmission rate of X bits/s; and
   configuring said physical layer device to operate in said selected one of said plurality of operating modes for communication substantially at X bits/s, wherein said configuration of said physical layer device in said selected one of said plurality of operating modes uses a first signal constellation that is different to a second signal constellation used by a different one of said plurality of operating modes.

2. The method of claim 1, wherein said determining comprises measuring said communication channel characteristics by said physical layer device.

3. The method of claim 1, wherein said determining comprises receiving a configuration using a network management protocol.

4. The method of claim 1, wherein said plurality of operating modes support 10 Gbit/s data transmission.

5. The method of claim 1, wherein said plurality of operating modes support 40 Gbit/s, 100 Gbit/s or 400 Gbit/s data transmission.

6. The method of claim 1, wherein said configuring comprises configuring said physical layer device to operate in a simplex mode.

7. The method of claim 1, wherein said configuring comprises configuring said physical layer device to operate with less than four twisted pairs.

8. The method of claim 1, wherein said configuring comprises deactivating a portion of said physical layer device that is used in said different one of said plurality of operating modes.

9. The method of claim 8, wherein said configuring comprises turning off cancellation circuitry in said physical layer device.

10. The method of claim 8, wherein said configuring comprises turning off encoding circuitry in said physical layer device.

11. The method of claim 1, wherein said configuring is part of an auto-negotiation process.

12. A physical layer device, comprising:
   a cable diagnostic module that is configured to determine communication channel characteristics of a twisted pair cable to which the physical layer device is coupled, wherein said communication channel characteristics include a length of said twisted pair cable; and
   a controller that is designed to select, based on said determined communication channel characteristics, between a plurality of operating modes for use by the physical layer device in communicating over said twisted pair cable at a data transmission rate of X bits/s, wherein each of said plurality of operating modes transmits substantially at the same data transmission rate of X bits/s, said controller being further designed to configure the physical layer device to operate in said selected one of said plurality of operating modes for communication substantially at X bits/s, wherein said selected one of said plurality of operating modes uses a first signal constellation that is different to a second signal constellation used by a different one of said plurality of operating modes.

13. The physical layer device of claim 12, wherein said plurality of operating modes support one of 10 Gbit/s, 40 Gbit/s, 100 Gbit/s and 400 Gbit/s data transmission.

14. The physical layer device of claim 12, wherein said selected one of said plurality of operating modes is a simplex mode.

15. The physical layer device of claim 12, wherein said selected one of said plurality of operating modes uses less than four twisted pairs.

16. The physical layer device of claim 12, wherein said selected one of said plurality of operating modes has a deactivated portion of the physical layer device, said deactivated portion configured for use in said different one of said plurality of operating modes.

17. The physical layer device of claim 16, wherein said deactivated portion is cancellation circuitry.

18. The physical layer device of claim 16, wherein said deactivated portion is encoding circuitry.

19. A method, comprising:
   selecting, by a physical layer device based on communication channel characteristics of a twisted pair cable, between a plurality of operating modes for use by said physical layer device in communicating over said twisted pair cable at a data transmission rate of X bits/s, wherein each of said plurality of operating modes transmits substantially at the same data transmission rate of X bits/s; and
   configuring, by said physical layer device, an operation of said physical layer device in said selected one of said plurality of operating modes, wherein said configuration of said physical layer device in said selected one of said plurality of operating modes uses a first signal constellation that is different to a second signal constellation used by a different one of said plurality of operating modes.

20. The method of claim 19, wherein said configuring is part of an auto-negotiation process by said physical layer device.

* * * * *